United States Patent
Wager et al.

(10) Patent No.: US 10,939,425 B2
(45) Date of Patent: *Mar. 2, 2021

(54) CONFIGURING WIRELESS COMMUNICATIONS RESOURCES

(71) Applicant: Telefonaktiebolaget LM Ericsson (publ), Stockholm (SE)

(72) Inventors: Stefan Wager, Espoo (FI); Erik Eriksson, Linköping (SE); Martin Hessler, Linköping (SE); Bengt Lindoff, Bjärred (SE); Osman Nuri Can Yilmaz, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,493

(22) Filed: Oct. 9, 2019

(65) Prior Publication Data
US 2020/0045679 A1 Feb. 6, 2020

Related U.S. Application Data

(63) Continuation of application No. 15/545,514, filed as application No. PCT/EP2015/051966 on Jan. 30, 2015, now Pat. No. 10,470,172.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0044* (2013.01); *H04L 5/0064* (2013.01);
(Continued)

(58) Field of Classification Search
None
See application file for complete search history.

(56) References Cited

U.S. PATENT DOCUMENTS

2007/0002726 A1 1/2007 Zangi
2009/0122771 A1* 5/2009 Cai ..................... H04L 27/2607
370/338
(Continued)

FOREIGN PATENT DOCUMENTS

CN 101110634 A 1/2008
CN 101632315 A 1/2010
(Continued)

*Primary Examiner* — Brandon M Renner
(74) *Attorney, Agent, or Firm* — Murphy, Bilak & Homilier, PLLC (57) ABSTRACT

A base station, in a wireless communications system, configures first resources for data access from devices to said base station, said first resources allowing a cyclic prefix having a first length; and configures second resources for data access from devices to said base station, said second resources allowing a cyclic prefix having a second length longer than the first length. The base station transmits configuration information regarding the configured resources to at least one device. The first resources allow at least data having a first useful data period and a cyclic prefix having the first length to be received in a first period having a first predetermined duration; and the second resources allow at least data having a second useful data period and a cyclic prefix having the second length to be received in a second period having the second predetermined duration, and the second predetermined duration is an integer multiple of the first predetermined duration.

23 Claims, 7 Drawing Sheets

(51) Int. Cl.
*H04L 27/26* (2006.01)
*H04W 72/00* (2009.01)

(52) U.S. Cl.
CPC ........ *H04L 5/0091* (2013.01); *H04L 27/2607* (2013.01); *H04W 72/005* (2013.01); *H04L 5/0007* (2013.01)

(56) References Cited

U.S. PATENT DOCUMENTS

| | | | |
|---|---|---|---|
| 2010/0195566 A1* | 8/2010 | Krishnamurthy | H04L 5/0007 370/328 |
| 2010/0246455 A1* | 9/2010 | Nangia | H04W 72/04 370/280 |
| 2012/0087257 A1 | 4/2012 | Larsson et al. | |
| 2013/0034079 A1 | 2/2013 | Takano | |
| 2013/0176995 A1 | 7/2013 | Park et al. | |
| 2014/0082147 A1 | 3/2014 | Pazos et al. | |
| 2014/0211782 A1 | 7/2014 | Yamaguchi et al. | |
| 2014/0293853 A1* | 10/2014 | Cho | H04W 56/0045 370/311 |
| 2015/0049687 A1 | 2/2015 | Kim et al. | |
| 2015/0078266 A1 | 3/2015 | Guo et al. | |
| 2016/0014753 A1* | 1/2016 | Wu | H04W 74/0833 370/280 |

FOREIGN PATENT DOCUMENTS

| | | |
|---|---|---|
| CN | 101790202 A | 7/2010 |
| CN | 103441778 A | 12/2013 |
| KR | 101208519 B1 | 12/2012 |
| WO | 2008020736 A2 | 2/2008 |

\* cited by examiner

CONFIGURING WIRELESS COMMUNICATIONS RESOURCES

RELATED APPLICATIONS

This application is a continuation of U.S. application Ser. No. 15/545,514 filed on 21 Jul. 2017, which is a U.S. National Phase Application of PCT/EP2015/051966 filed on 30 Jan. 2015. The entire contents of each aforementioned application is incorporated herein by reference.

TECHNICAL FIELD

This relates to a wireless mobile communications network, and in particular to a method for allowing a device to communicate with a base station in the network.

BACKGROUND

In order for a device in a wireless mobile communications system to be able to transmit signals that can be received by a base station in the network, it is often necessary for the device to transmit signals at specific times. The base station typically allocates specific time slots in which it can receive signals transmitted by devices, and so it is necessary for the devices to transmit those signals at times that take account of the time taken for the signal to propagate from the device to the base station.

Typically, there is a synchronization mechanism, by which a device can determine this propagation delay, and establish a value for a transmission time offset, so that it transmits its signals at times that ensure that the signals are received by the base station within the correct time window.

However, the synchronization mechanism takes a certain period of time, and requires messages to be exchanged between the device and the base station.

In some situations, it is advantageous for the device to be able to send messages with very low latency. For example, a sensor device may be configured so that it sends an alarm message when certain conditions are detected. Because the conditions are rare, the sensor device may not remain actively connected to the network. However, when the alarm conditions are detected, the alarm message should be sent with low latency and high reliability.

SUMMARY

According to a first aspect of the present invention, there is provided a method of operation of a base station in a wireless communications system. The method comprises: configuring first resources for data access from devices to said base station, said first resources allowing a cyclic prefix having a first length; configuring second resources for data access from devices to said base station, said second resources allowing a cyclic prefix having a second length longer than the first length. The base station transmits configuration information regarding the configured resources to at least one device.

In some embodiments, the first resources allow at least data having a first useful data period and a cyclic prefix having the first length to be received in a first period having a first predetermined duration; and the second resources allow at least data having a second useful data period and a cyclic prefix having the second length to be received in a second period having the second predetermined duration. In such embodiments, the second predetermined duration is an integer multiple of the first predetermined duration.

According to a second aspect of the present invention, there is provided a base station, for use in a wireless communications system. The base station is configured for: configuring first resources for data access from devices to said base station, said first resources allowing a cyclic prefix having a first length; configuring second resources for data access from devices to said base station, said second resources allowing a cyclic prefix having a second length longer than the first length. The base station is further configured for transmitting configuration information regarding the configured resources to at least one device.

According to a third aspect of the present invention, there is provided a method of operation of a communications device in a wireless communications system. The method comprises: receiving from a base station configuration information regarding configured first resources for data access from devices, said first resources allowing a cyclic prefix having a first length and regarding configured second resources for data access from devices, said second resources allowing a cyclic prefix having a second length longer than the first length. The method further comprises sending data to the base station using said configured second resources with a cyclic prefix having said second length.

According to a fourth aspect of the present invention, there is provided a communications device, for use in a wireless communications system. The communications device is configured for: receiving from a base station configuration information regarding configured first resources for data access from devices, said first resources allowing a cyclic prefix having a first length and regarding configured second resources for data access from devices, said second resources allowing a cyclic prefix having a second length longer than the first length. The communications device is further configured for sending data to the base station using said configured second resources with a cyclic prefix having said second length.

According to a fifth aspect of the present invention, there is provided a computer program product, comprising computer-readable code, for causing a processor to perform a method according to first or third aspect.

DETAILED DESCRIPTION

Figure 1:
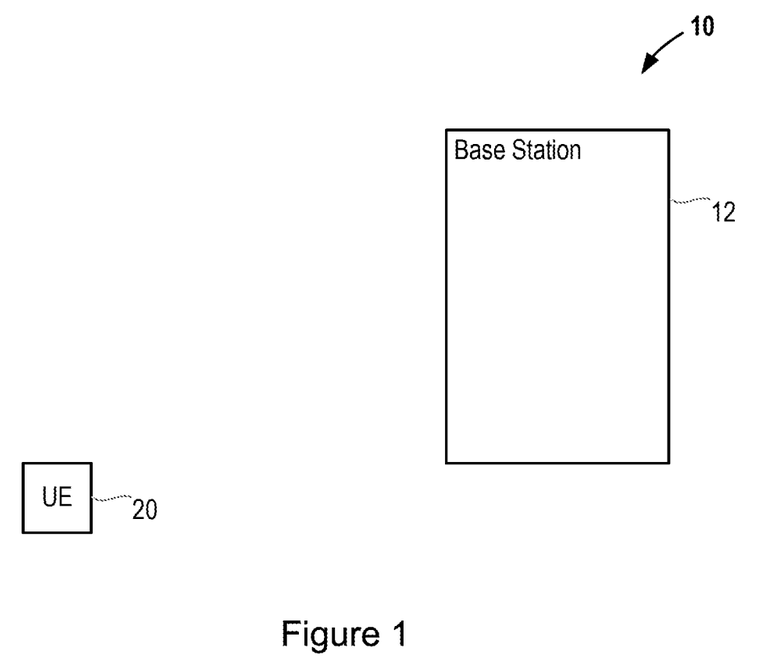
FIG. 1 shows a part of a communications network.

FIG. 1 illustrates a part of a communications network 10, comprising a base station 12, and a user equipment (UE) device 20.

The base station 12 provides coverage for devices in its cell, and is typically connected to a core network of the communications network 10, allowing those devices to establish connections to other compatible devices.

The device 20 is able to connect to the base station in whose coverage area it is located, but may also be able to detect signals transmitted by other base stations. The device 20 may take the form of a portable communications device such as a cellular phone, but may also take the form of a user device that is generally intended to remain in a fixed location, or may take the form of a device that automatically connects to the network when it has data to send. For example, a sensor may be provided at a fixed location, with the intention that it should transmit an alarm message, or sensor data, either at fixed time intervals or when an alarm condition is detected.

Figure 2:
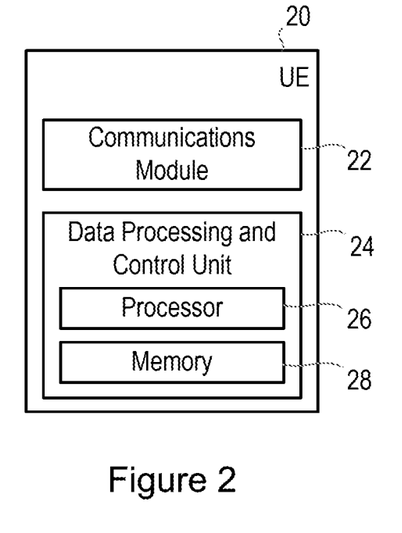
FIG. 2 shows an example of a device from the network of FIG. 1.

FIG. 2 shows the form of the device 20. Specifically, the device 20 includes a communications module 22 and a data processing and control unit 24. The data processing and control unit 24 includes a processor 26 and a memory 28. The processor 26 performs data processing and logical operations, and the memory 28 stores working data and program instructions for causing the processor to perform the methods described herein. The communications module 22 generates signals in a suitable form for transmission in accordance with a suitable communications standard, and also receives signals that have been transmitted in accordance with a suitable communications standard, and extracts data from the received signals.

Figure 3:
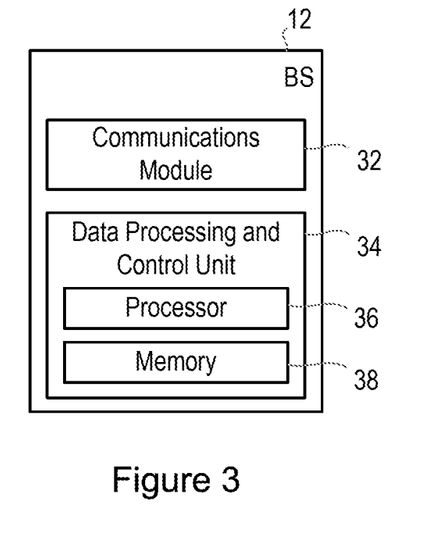
FIG. 3 shows an example of a base station from the network of FIG. 1.

FIG. 3 shows the form of the base station 12. Thus, the base station 12 includes a communications module 32 and a data processing and control unit 34. The data processing and control unit 34 includes a processor 36 and a memory 38. The processor 36 performs data processing and logical operations, and the memory 38 stores working data and program instructions for causing the processor to perform the methods described herein. The communications module 22 generates signals in a suitable form for transmission in accordance with a suitable communications standard, and also receives signals that have been transmitted in accordance with a suitable communications standard, and extracts data from the received signals.

Figure 4:
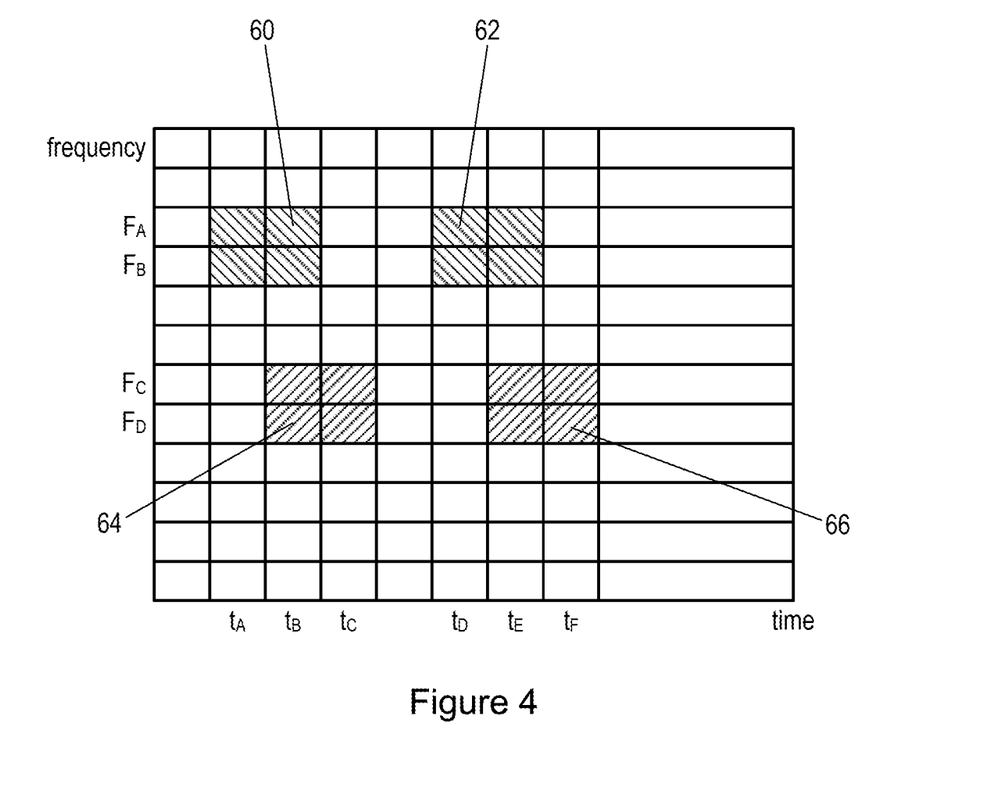
FIG. 4 shows the allocation of resources in the network of FIG. 1.

The method is described herein with reference to a communications network 10 that uses Orthogonal Frequency Division Multiplexing (OFDM) for its uplink to allocate resources between different users. Thus, in one example, as shown in FIG. 4, the available bandwidth is divided into multiple carriers, with FIG. 4 showing one such carrier. The carrier is then sub-divided into multiple sub-carriers, with FIG. 4 illustrating a total of 12 sub-carriers, including the sub-carriers fA, fB, fC, and fD, each with a predetermined bandwidth. The time is divided into multiple time slots, with FIG. 4 illustrating time slots including the time slots tA, tB, tC, tD, tE, and tF, with each time slot having a predetermined duration. The duration of one time slot may be an integer multiple of the period of one OFDM symbol as transmitted on the uplink.

FIG. 4 therefore shows the time-frequency grid that defines the available uplink resources. Each combination of one sub-carrier and one OFDM symbol period is referred to here as a resource element, and the resource elements may be grouped into resource blocks that contain multiple sub-carriers in the frequency domain and multiple OFDM symbol periods in the time domain.

Although the method is described here with reference to a communications network that uses OFDM for its uplink, it should be noted that the methods described herein are also applicable to single-carrier systems in which a cyclic prefix is used.

Figure 5:
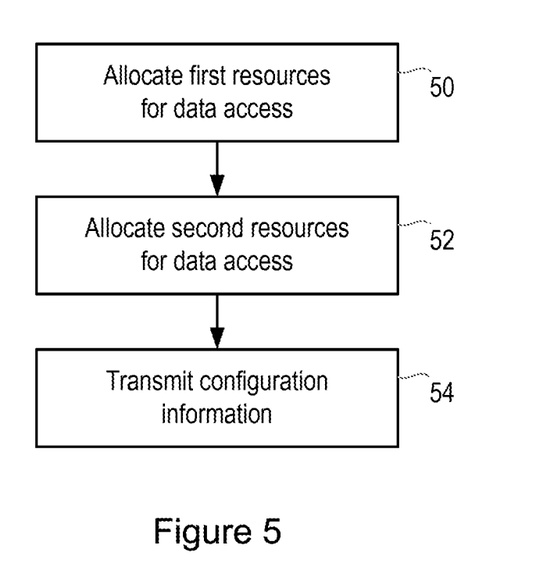
FIG. 5 is a flow chart, illustrating an example of a method performed in the base station of FIG. 3.

FIG. 5 is a flow chart, showing the steps taken by a base station such as the base station 12, in a wireless communications network having available time and frequency resources, for configuring its uplink.

In step 50, the base station configures resources for a first type of data access, for example allowing a device such as the device 20 to initiate a random access procedure. In the first data access type, the device needs to be synchronized with the base station on the uplink. That is, the device needs to be able to transmit a signal that will be received at the base station at the intended time, and to be able to transmit a signal with the intended frequency.

For the purposes of illustration, FIG. 4 shows a resource block 60 comprising the frequency sub-carriers $f_A$ and $f_B$, during the time slots $t_A$ and $t_B$, which is allocated for the first type of data access. FIG. 4 also shows a resource block 62 comprising the frequency sub-carriers $f_A$ and $f_B$, during the time slots $t_D$ and $t_E$, which is also allocated for the first type of data access.

The base station configures these first resources, namely the resource blocks 60, 62 in this example, such that the base station can detect transmissions from devices including a cyclic prefix having a first length. Thus, for a given amount of expected data (that is, a predetermined number of data symbols), the base station configures itself such that it is able to receive the signal provided that the start of the transmission is received during a period having a duration that is equal to the first length of the cyclic prefix.

In step 52, the base station configures resources for a second type of data access, for example allowing a device such as the device 20 to transmit an alarm message (although the same configuration allows any data to be transmitted during the configured period). In the second data access type, the requirements for the device to be synchronized with the base station are relaxed, compared with the requirements that apply to the first data access type.

For the purposes of illustration, FIG. 4 shows a resource block 64 comprising the frequency sub-carriers $f_C$ and $f_D$, during the time slots $t_B$ and $t_C$, which is allocated for the second type of data access. FIG. 4 also shows a resource block 66 comprising the frequency sub-carriers $f_C$ and $f_D$, during the time slots $t_E$ and $t_F$, which is also allocated for the second type of data access.

The base station configures these second resources, namely the resource blocks 64, 66 in this example, such that the base station can detect transmissions from devices including a cyclic prefix having a second length. Thus, for a given amount of expected data (that is, a predetermined number of data symbols), the base station configures itself such that it is able to receive the signal provided that the start of the transmission is received during a period having a duration that is equal to the second length of the cyclic prefix.

As described in more detail below, the second data access type may be configured to include fewer resource elements per given time for carrying information bits, with the effect that tight synchronization requirements can be relaxed.

In step 54 of the process shown in FIG. 5, the base station transmits the configuration information. That is, the base station transmits information identifying the first and second resources that are available for data accesses.

In some embodiments, the base station transmits the configuration information on a broadcast channel. In alternative embodiments, the base station transmits the configuration information to a specific device using dedicated RRC signaling. In yet other embodiments, physical layer signaling is used to control access to the resources signaled in the configuration information. For instance, a scheduling grant or semi persistent scheduling grant can be used to indicate to a device that it is free to use the configured resources for the first or second type of data transmission. The configuration can be signalled during an admission control phase when the device joins the network. For example, the base station (or other network node) can assign specific second resources for the second type of data access to each device, so that the respective device can use the resources for time critical messages (such as alarm signals).

Figure 6:
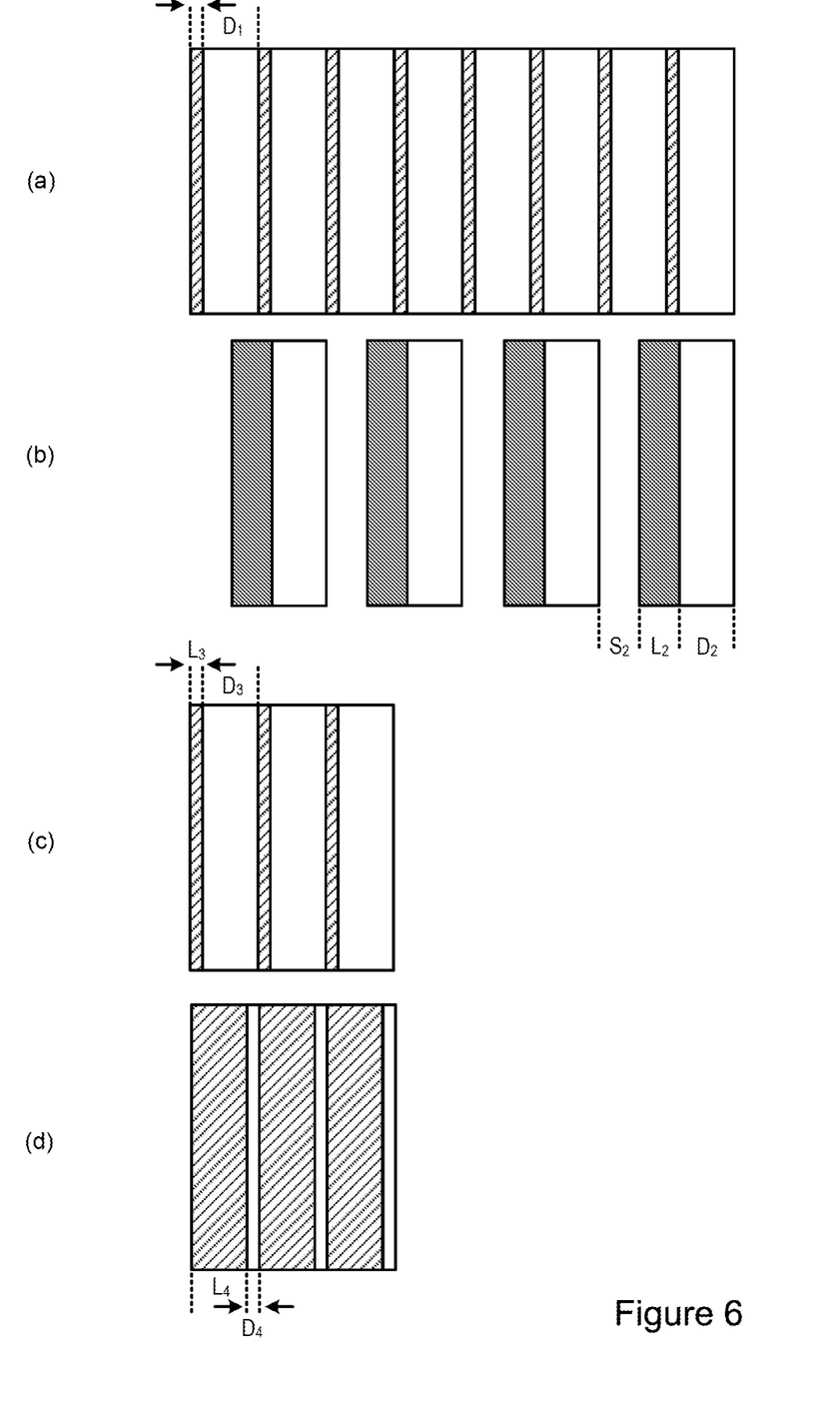
FIG. 6 illustrates signals that may be transmitted by a device in the network.

FIG. 6 illustrates forms of data signals that may be sent in the first and second type of data accesses.

FIG. 6(a) shows a first series of data accesses of the first type. Thus, a device such as the device 20 that wishes to use the first resources may transmit one or more signals, with each signal comprising data, having a length $D_1$ that corresponds to a first specified number of OFDM samples, and a first cyclic prefix having a first cyclic prefix length $L_1$.

The total length of the signal, that is, $(D_1+L_1)$, may be equal to the length of one of the time slots shown in FIG. 4, or to an integer multiple of that length.

FIG. 6(b) shows a second series of data accesses, in this case data accesses of the second type. Thus, a device such as the device 20 that wishes to use the second resources may transmit one or more signals, with each signal comprising data, having a length $D_2$ that corresponds to a second specified number of OFDM samples, a second cyclic prefix having a second cyclic prefix length $L_2$, and a silent period, during which there is zero transmitted power, having a length S.

The total length of the signal, that is, $(D_2+L_2+S)$, may be equal to the length of one of the time slots shown in FIG. 4, or to an integer multiple of that length.

In the example shown in FIGS. 6(a) and (b), the first specified number of OFDM samples is equal to the second specified number of OFDM samples, and so the length $D_1$ is equal to the length $D_2$, while the total length of the first signal, that is, $(D_1+L_1)$, is equal to the length of one of the time slots shown in FIG. 4 (that is, one OFDM symbol period), and the total length of the second signal, that is, $(D_2+L_2+S)$, is equal to the length of two of the time slots shown in FIG. 4 (that is, two OFDM symbol periods). Thus, the second data accesses with the second cyclic prefix length can co-exist in the same time slot arrangement as the first data accesses with the first cyclic prefix length, and symbol alignment is maintained.

FIG. 6(c) shows a second series of data accesses of the first type. Thus, a device such as the device 20 that wishes to use the first resources may transmit one or more signals, with each signal comprising data, having a length $D_3$ that corresponds to a first specified number of OFDM samples, and a first cyclic prefix having a first cyclic prefix length $L_3$.

The total length of the signal, that is, $(D_3+L_3)$, may be equal to the length of one of the time slots shown in FIG. 4, or to an integer multiple of that length.

FIG. 6(d) shows a second series of data accesses of the second type. Thus, a device such as the device 20 that wishes to use the second resources may transmit one or more signals, with each signal comprising data, having a length $D_4$ that corresponds to a second specified number of OFDM samples, and a second cyclic prefix having a second cyclic prefix length $L_4$.

The total length of the signal, that is, $(D_4+L_4)$, may be equal to the length of one of the time slots shown in FIG. 4, or to an integer multiple of that length.

In the example shown in FIGS. 6(c) and (d), the first specified number of OFDM samples is greater than the second specified number of OFDM samples, and so the length $D_3$ is greater than the length $D_4$, while the total length of the first signal, that is, $(D_3+L_3)$, is equal to the length of one of the time slots shown in FIG. 4, and the total length of the second signal, that is, $(D_4+L_4)$, is also equal to the length of one of the time slots shown in FIG. 4.

Thus, in the example shown in FIGS. 6(c) and (d), the longer cyclic prefix is applied to some OFDM samples while other OFDM samples are dropped, resulting in not shifting the transmitted OFDM symbol in time compared to the first data access type. Again, the second data accesses with the second cyclic prefix length can co-exist in the same time slot arrangement as the first data accesses with the first cyclic prefix length, and symbol alignment is maintained.

In a special case of this, the data part of the signal comprises one OFDM symbol, with a cyclic prefix spanning multiple OFDM symbols, in order to maintain orthogonality to adjacent subcarriers using a different cyclic prefix for all but the first and last symbol. A base station receiving such signals may not discard the entire cyclic prefix but could combine multiple copies of the same data.

Figure 7:
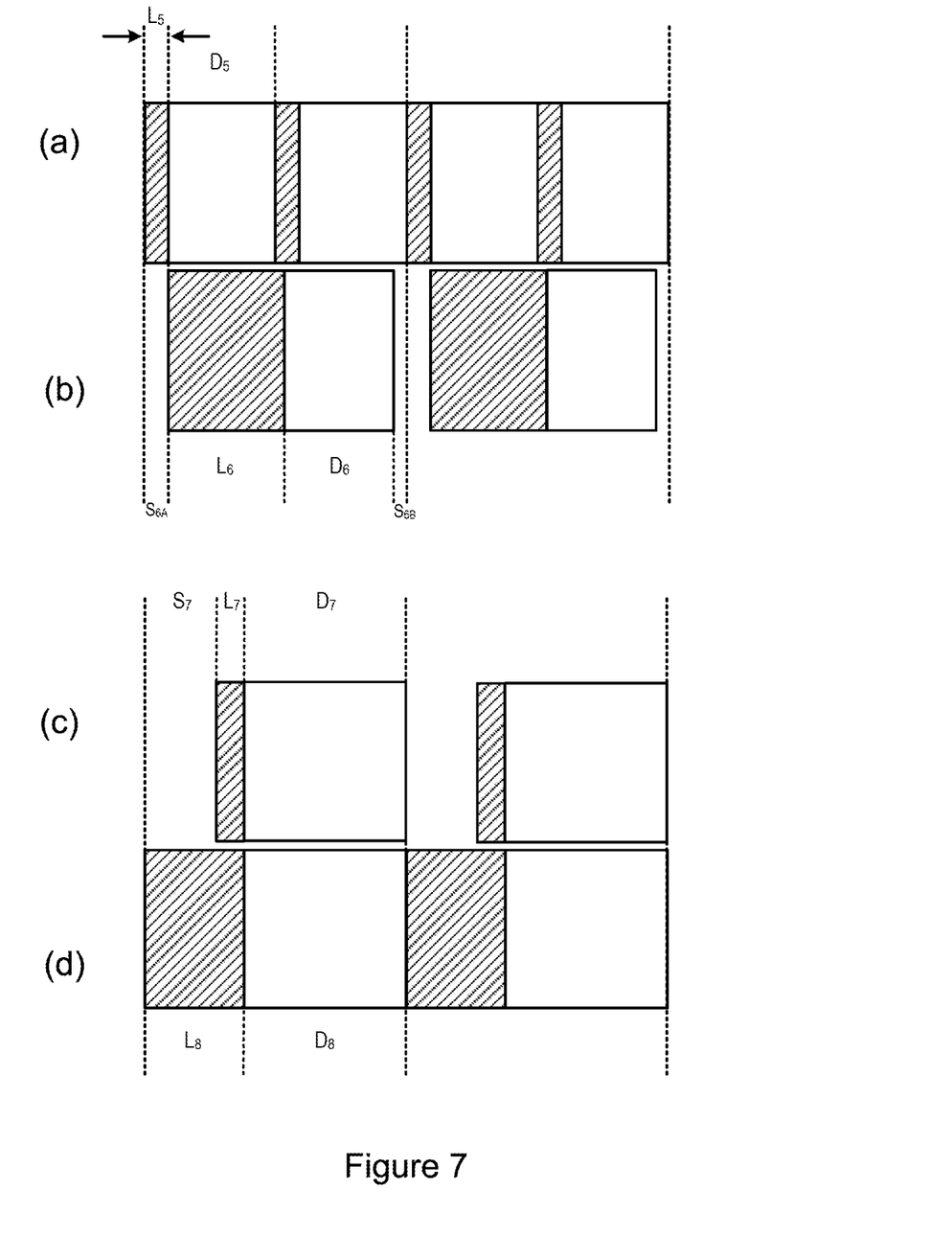
FIG. 7 illustrates alternative signals that may be transmitted by a device in the network.

FIG. 7 illustrates further forms of data signals that may be sent in the first and second type of data accesses.

FIG. 7(a) shows a third series of data accesses of the first type. Thus, a device such as the device 20 that wishes to use the first resources may transmit one or more signals, with each signal comprising data, having a length $D_5$ that corresponds to a first specified number of OFDM samples, and a first cyclic prefix having a first cyclic prefix length $L_5$.

The total length of the signal, that is, $(D_5+L_5)$, may be equal to the length of one of the time slots shown in FIG. 4, or to an integer multiple of that length.

FIG. 7(b) shows a third series of data accesses of the second type. Thus, a device such as the device 20 that wishes to use the second resources may transmit one or more signals, with each signal comprising data, having a length $D_6$ that corresponds to a second specified number of OFDM samples, a second cyclic prefix having a second cyclic prefix length $L_6$, and two silent periods, during which there is zero transmitted power, having lengths $S_{6A}$ and $S_{6B}$.

The total length of the signal, that is, $(D_6+L_6+S_{6A}+S_{6B})$, may be equal to the length of one of the time slots shown in FIG. 4, or to an integer multiple of that length.

In the example shown in FIGS. 7(a) and (b), the first specified number of OFDM samples is equal to the second specified number of OFDM samples, and so the length $D_5$ is equal to the length $D_6$, while the total length of the first signal, that is, $(D_5+L_5)$, is equal to the length of one of the time slots shown in FIG. 4 (that is, one OFDM symbol period), and the total length of the second signal, that is, $(D_6+L_6+S_{6A}+S_{6B})$, is equal to the length of two of the time slots shown in FIG. 4 (that is, two OFDM symbol periods). Thus, the second data accesses with the second cyclic prefix length can co-exist in the same time slot arrangement as the first data accesses with the first cyclic prefix length, and symbol alignment is maintained.

Moreover, while the length of the data part $D_6$ corresponds to a second specified number of OFDM samples, and may therefore be fixed, and while the total length of the signal $(D_6+L_6+S_{6A}+S_{6B})$ may be equal to a predetermined integer number of OFDM symbol periods, and may therefore also be fixed, the distribution of the remaining part of the signal between the second cyclic prefix and the silent period or periods may be adaptable.

Thus, for example, the way in which the remaining part of the signal is divided between the second cyclic prefix and the silent period or periods may be selected, based on measurements that are made or on a specific configuration of the user device.

FIG. 7(c) shows a fourth series of data accesses of the first type. Thus, a device such as the device 20 that wishes to use the first resources may transmit one or more signals, with each signal comprising data, having a length $D_7$ that corresponds to a first specified number of OFDM samples, a first cyclic prefix having a first cyclic prefix length $L_7$ and a silent period having a length The total length of the signal, that is, $(D_7+L_7+S_7)$, may be equal to the length of one of the time slots shown in FIG. 4, or to an integer multiple of that length.

FIG. 7(d) shows a second series of data accesses of the second type. Thus, a device such as the device 20 that wishes to use the second resources may transmit one or more signals, with each signal comprising data, having a length $D_8$ that corresponds to a second specified number of OFDM samples, and a second cyclic prefix having a second cyclic prefix length La.

The total length of the signal, that is, $(D_8+L_8)$, may be equal to the length of one of the time slots shown in FIG. 4, or to an integer multiple of that length.

In the example shown in FIGS. 7(c) and (d), the first specified number of OFDM samples is equal to the second specified number of OFDM samples, and so the length $D_7$ is equal to the length $D_8$, while the total length of the first signal, that is, $(D_7+L_7+S_7)$, is equal to the length of one of the time slots shown in FIG. 4, and the total length of the second signal, that is, $(D_8+L_8)$, is also equal to the length of one of the time slots shown in FIG. 4.

Thus, in this example, a user that is better synchronized with the base station, or has the benefit of a less dispersive channel, is able to use the data access of the first type, with a shorter cyclic prefix, and can therefore save power by not using any power during the silent period.

Figure 8:
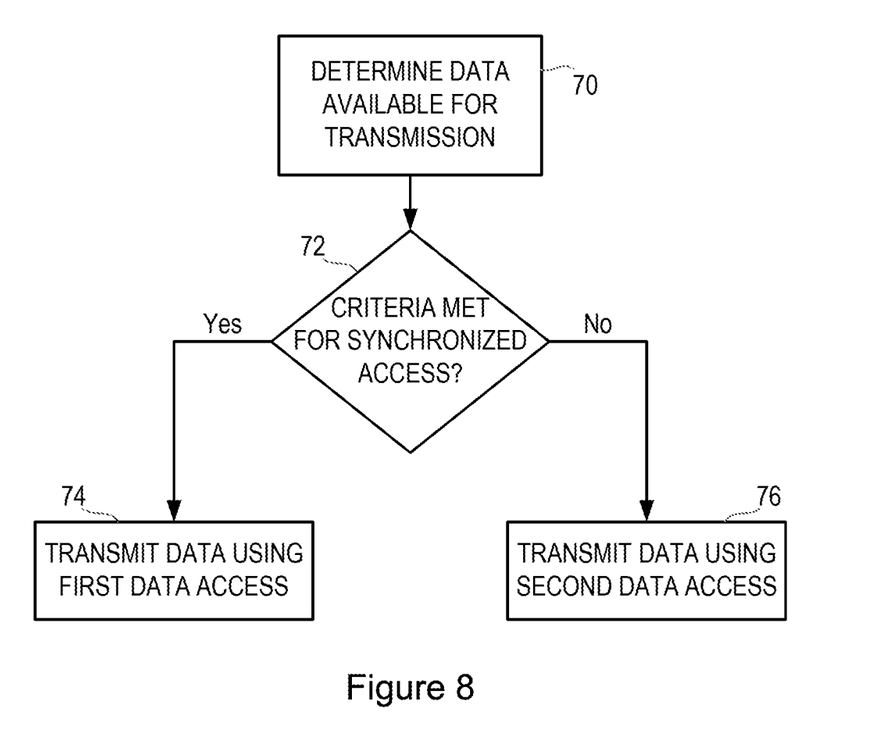
FIG. 8 is a flow chart, showing an example of a method performed in a device in the network.

FIG. 8 is a flow chart, illustrating a process performed in a device such as the device 20. The process begins at step 70, when the device determines that it has data available for transmission. In step 72, the device determines whether predetermined criteria for synchronized uplink transmission are met.

For example, the device may determine that the predetermined criteria for synchronized uplink transmission are met, depending on the time that has elapsed since the device was last uplink synchronized, or since it was last signalled a timing value from the network.

As another example, the device may determine that the predetermined criteria for synchronized uplink transmission are met, dependent on measurements of downlink signals. As an example of this, it may receive timing signals from the base station or other base stations. As another example, the device may measure the received strength of one or more signals, and determine how they differ from the received strength of the same signals when the device was last synchronized. If the signal strength has not changed greatly, it may be determined that the device remains synchronized on the uplink with the base station.

As another example, the device may determine whether the predetermined criteria for synchronized uplink transmission are met, based on the type of data for transmission.

If the device determines in step 72 that the predetermined criteria for synchronized uplink transmission are met, the process passes to step 74, and the device sends the data using the first data access, using the first length cyclic prefix.

If the device determines in step 72 that the predetermined criteria for synchronized uplink transmission are not met, the process passes to step 76, and the device sends the data using the second data access, using the second length cyclic prefix.

Thus, if a synchronization procedure would be required, the device is able to send the data without performing that synchronization, but with a high probability of successful receipt.

FIG. 8 shows an example where a device can determine for any given data access whether to use the first data access type or the second data access type. In other embodiments, as mentioned above, the device may be configured to send all data using the second data access.

For example, time-critical data, such as alarm signals, where the latency needs to be as low as possible, may always be sent using the second data access type.

In the embodiments described above, the first resources configured for data access from devices to said base station, allowing a cyclic prefix having a first length, are different from the second resources configured for data access from devices to said base station, allowing a cyclic prefix having a second length. However, in alternative embodiments, the base station may configure the same resources (that is, the same time slots and frequency subcarriers) for the second type of data access as are configured for the first type of data access. This may be beneficial in a situation where uplink resources are limited. In this case, blind decoding is needed in the receiver during the data transfer phase in order to detect whether the received transmission is using the first or second type of data access.

There is thus described a system for allowing devices for transmitting data to a network node, even in situations where the device has not achieved uplink synchronization with the node.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

EMBODIMENTS

1. A method of operation of a base station in a wireless communications system, the method comprising:
  configuring first resources for data access from devices to said base station, said first resources allowing a cyclic prefix having a first length;
  configuring second resources for data access from devices to said base station, said second resources allowing a cyclic prefix having a second length longer than the first length; and
  transmitting configuration information regarding the configured resources to at least one device.

2. A method as in 1, wherein:
  said first resources allow at least data having a first useful data period and a cyclic prefix having the first length to be received in a first period having a first predetermined duration; and
  said second resources allow at least data having a second useful data period and a cyclic prefix having the second length to be received in a second period having the second predetermined duration, wherein the second predetermined duration is an integer multiple of the first predetermined duration.

3. A method as in 2, wherein:
the first period contains a first silent period.

4. A method as in 2, wherein:
the second period contains a second silent period.

5. A method as in 4, wherein:
the second length, and a length of the second silent period can be adapted.

6. A method as in one of 2 to 5, wherein:
the first useful data period is equal to the second useful data period.

7. A method as in one of 2 to 5, wherein:
the first useful data period is not equal to the second useful data period.

8. A method as in one of 2 to 7, wherein:
the second predetermined duration equals the first predetermined duration.

9. A method as in one of 2 to 7, wherein:
the second predetermined duration is longer than the first predetermined duration.

10. A method as in one of 2 to 9, wherein:
the first predetermined duration is one OFDM symbol period.

11. A method as in one of 2 to 9, wherein:
the first predetermined duration is equal to an integer number of time slots in a time-frequency resource grid.

12. A method as in one of 1 to 11, comprising transmitting the configuration information on a broadcast channel.

13. A method as in one of 1 to 11, comprising transmitting the configuration information to the at least one device on a dedicated channel.

14. A base station, for use in a wireless communications system, the base station being configured for:
configuring first resources for data access from devices to said base station, said first resources allowing a cyclic prefix having a first length;
configuring second resources for data access from devices to said base station, said second resources allowing a cyclic prefix having a second length longer than the first length; and
transmitting configuration information regarding the configured resources to at least one device.

15. A base station as in 14, wherein:
said first resources allow at least data having a first useful data period and a cyclic prefix having the first length to be received in a first period having a first predetermined duration; and
said second resources allow at least data having a second useful data period and a cyclic prefix having the second length to be received in a second period having the second predetermined duration, wherein the second predetermined duration is an integer multiple of the first predetermined duration.

16. A method of operation of a communications device in a wireless communications system, the method comprising:
receiving from a base station configuration information regarding configured first resources for data access from devices, said first resources allowing a cyclic prefix having a first length and regarding configured second resources for data access from devices, said second resources allowing a cyclic prefix having a second length longer than the first length; and
sending data to the base station using said configured second resources with a cyclic prefix having said second length.

17. A method as in 16, comprising sending data to the base station using said configured second resources in response to determining that the communications device is not synchronized with the base station.

18. A method as in 16 or 17, wherein said second resources allow at least data having a second useful data period and a cyclic prefix having the second length to be received in a second period, and wherein the second period also contains a second silent period, the method comprising determining a length of the second silent period.

19. A method as in 18, comprising determining the length of the second silent period based on a measurement made in the communications device.

20. A method as in 18, comprising determining the length of the second silent period based on signalling received from the base station.

21. A communications device, for use in a wireless communications system, the communications device being configured for:
receiving from a base station configuration information regarding configured first resources for data access from devices, said first resources allowing a cyclic prefix having a first length and regarding configured second resources for data access from devices, said second resources allowing a cyclic prefix having a second length longer than the first length; and
sending data to the base station using said configured second resources with a cyclic prefix having said second length.

22. A computer program product, comprising computer-readable code, for causing a processor to perform a method as in one of 1 to 13 or 16 to 20.

A base station, for use in a wireless communications system, the base station comprising:
a configuration module, for configuring first resources for data access from devices to said base station, said first resources allowing a cyclic prefix having a first length; and for configuring second resources for data access from devices to said base station, said second resources allowing a cyclic prefix having a second length longer than the first length; and
a transmitting module, for transmitting configuration information regarding the configured resources to at least one device.

A communications device, for use in a wireless communications system, the communications device comprising:
a receiving module, for receiving from a base station configuration information regarding configured first resources for data access from devices, said first resources allowing a cyclic prefix having a first length and regarding configured second resources for data access from devices, said second resources allowing a cyclic prefix having a second length longer than the first length; and
a transmitting module, for sending data to the base station using said configured second resources with a cyclic prefix having said second length.

What is claimed is:

1. A method of operation of a base station in a wireless communications system, the method comprising:
transmitting, to a wireless communications device, allocation information indicating first radio resources and second radio resources for use in performing an uplink data transmission, where, for use of the first radio resources by the wireless communications device, the base station expects to receive the uplink data transmission a signal having a total length that includes a useful-data portion having a length corresponding to predetermined number of data symbols and a cyclic-prefix portion having a length equal to a first CP length, and expects the start of the uplink data transmission to be received in a first period having a first predetermined duration, and where, for use of the second radio resources by the wireless communications device, the base station expects to receive the uplink data transmission as a signal having a total length that includes a useful-data portion having a length corresponding to predetermined number of data symbols and a cyclic-prefix portion having a length equal to a second CP length, and expects the start of the uplink data transmission to be received in a second period having a second predetermined duration, the second CP length being longer than the first CP length; and receiving the uplink data transmission from the wireless communications device, either on the first radio resources or the second radio resources;

wherein the uplink data transmission comprises one of a first type of data access or a second type of data access in dependence on whether the wireless communications device used the first radio resources or the second radio resources.

2. The method as claimed in claim 1, wherein the first period contains a first silent period.

3. The method as claimed in claim 1, wherein the second period contains a second silent period.

4. The method as claimed in claim 1, wherein the second CP length and a length of the second silent period are adaptable.

5. The method as claimed in claim 1, wherein a length of the useful-data portion is the same for the first and second types of data access.

6. The method as claimed in claim 1, wherein a length of the useful-data portion differs for the first and second types of data access.

7. The method as claimed in claim 1, wherein the second predetermined duration equals the first predetermined duration.

8. The method as claimed in claim 1, wherein the second predetermined duration is longer than the first predetermined duration.

9. The method as claimed in claim 1, wherein the first predetermined duration is one orthogonal frequency-division multiplexing (OFDM) symbol period.

10. The method as claimed in claim 1, wherein the first predetermined duration is equal to an integer number of time slots in a time-frequency resource grid.

11. The method as claimed in claim 1, wherein transmitting the allocation information comprises transmitting the information on a broadcast channel.

12. The method as claimed in claim 1, wherein, at least for the second radio resources, transmitting the allocation information comprises transmitting information to the wireless communications device on a dedicated channel.

13. A base station, for use in a wireless communications system, the base station comprising:

communication circuitry configured for communicating with wireless communications devices; and processing circuitry operatively associated with the communication circuitry and configured to:

transmit, for a wireless communications device, allocation information indicating first radio resources and second radio resources for use in performing an uplink data transmission, where, for use of the first radio resources by the wireless communications device, the base station expects to receive the uplink data transmission as a signal having a total length that includes a useful-data portion having a length corresponding to predetermined number of data symbols and a cyclic-prefix portion having a length equal to a first CP length, and expects the start of the uplink data transmission to be received in a first period having a first predetermined duration, and where, for use of the second radio resources by the wireless communications device, the base station expects to receive the uplink data transmission as a signal having a total length that includes a useful-data portion having a length corresponding to predetermined number of data symbols and a cyclic-prefix portion having a length equal to a second CP length, and expects the start of the uplink data transmission to be received in a second period having a second predetermined duration, the second CP length being longer than the first CP length; and receive the uplink data transmission from the wireless communications device, either on the first radio resources or the second radio resources;

wherein the uplink data transmission comprises one of a first type of data access or a second type of data access in dependence on whether the wireless communications device used the first radio resources or the second radio resources.

14. The base station of claim 13, wherein, at least for the second radio resources, the allocation information is transmitted to the wireless communications device on a dedicated channel.

15. A method of operation of a wireless communications device in a wireless communications system, the method comprising:

receiving allocation information indicating first radio resources and second radio resources for use in performing an uplink data transmission, where, for use of the first radio resources by the wireless communications device, the base station expects to receive the uplink data transmission as a signal having a total length that includes a useful-data portion having a length corresponding to predetermined number of data symbols and a cyclic-prefix portion having a length equal to a first CP length, and expects the start of the uplink data transmission to be received in a first period having a first predetermined duration, and where, for use of the second radio resources by the wireless communications device, the base station expects to receive the uplink data transmission as a signal having a total length that includes a useful-data portion having a length corresponding to predetermined number of data symbols and a cyclic-prefix portion having a length equal to a second CP length, and expects the start of the uplink data transmission to be received in a second period having a second predetermined duration, the second CP length being longer than the first CP length; and performing the uplink data transmission either as a first type of data access using the first radio resources or as a second type of data access using the second radio resources.

16. The method as claimed in claim 15, wherein, with respect to performing the uplink data transmission, the method includes selecting the first type of data access and correspondingly using the first radio resources, if the wireless communications device is in uplink synchronization with the base station, and selecting the second type of data access and correspondingly using the second radio resources, if the wireless communications device is not in uplink synchronization with the base station.

17. The method as claimed in claim 15, wherein, the method includes the wireless communications device determining a length of a silent period preceding the start of the uplink data transmission.

18. The method as claimed in claim 17, further comprising determining the length of the silent period based on a measurement made in the wireless communications device.

19. The method as claimed in claim 17, further comprising determining the length of the silent period based on signaling received from the base station.

20. The method as claimed in claim 15, wherein at least for the second radio resources, the wireless device receives the allocation information on a dedicated channel.

21. A wireless communications device, for use in a wireless communications system, the wireless communications device comprising:
communication circuitry configured for communicating with a base station in the wireless communications system; and
processing circuitry operatively associated with the communication circuitry and configured to:
receive allocation information for first radio resources and second radio resources for use in performing an uplink data transmission, where, for use of the first radio resources by the wireless communications device, the base station expects to receive the uplink data transmission as a signal having a total length that includes a useful-data portion having a length corresponding to predetermined number of data symbols and a cyclic-prefix portion having a length equal to a first CP length, and expects the start of the uplink data transmission to be received in a first period having a first predetermined duration, and where, for use of the second radio resources by the wireless communications device, the base station expects to receive the uplink data transmission as a signal having a total length that includes a useful-data portion having a length corresponding to predetermined number of data symbols and a cyclic-prefix portion having a length equal to a second CP length, and expects the start of the uplink data transmission to be received in a second period having a second predetermined duration, the second CP length being longer than the first CP length; and
perform an uplink data transmission either as a first type of data access using the first radio resources or as a second type of data access using the second radio resources.

22. The wireless communications device as claimed in claim 21, wherein, with respect to performing the uplink data transmission, the wireless communications device selects the first type of data access and correspondingly uses the first radio resources, if the wireless communications device is in uplink synchronization with the base station, and selects the second type of data access and correspondingly uses the second radio resources, if the wireless communications device is not in uplink synchronization with the base station.

23. The wireless communications device as claimed in claim 21, wherein, at least for the second radio resources, the wireless communications device receives the allocation information on a dedicated channel.

* * * * *